United States Patent [19]

Izawa et al.

[11] Patent Number: 5,540,950
[45] Date of Patent: Jul. 30, 1996

[54] COMPOSITE OF SILICON CARBIDE AND CARBON AND METHOD OF MAKING THE SAME

[75] Inventors: Hajime Izawa, Toyonaka; Takehito Arai; Taiji Yamamoto, both of Hirakata, all of Japan

[73] Assignee: Sumitomo Osaka Cement Co., Ltd., Tokyo, Japan

[21] Appl. No.: 333,366

[22] Filed: Nov. 2, 1994

Related U.S. Application Data

[60] Division of Ser. No. 200,689, Feb. 23, 1994, abandoned, which is a continuation-in-part of Ser. No. 975,341, Nov. 16, 1992, abandoned, which is a continuation-in-part of Ser. No. 886,335, May 20, 1992, abandoned, which is a continuation of Ser. No. 427,093, Jun. 6, 1990, abandoned.

[51] Int. Cl.$^6$ ........................................................ B05D 3/02
[52] U.S. Cl. ..................... 427/228; 427/397.7; 427/431; 501/88; 501/90
[58] Field of Search .................. 427/397.7, 431, 427/228; 501/88, 90

[56] References Cited

U.S. PATENT DOCUMENTS

| | | | |
|---|---|---|---|
| 2,614,947 | 10/1952 | Heyroth | 117/106 |
| 2,677,627 | 5/1954 | Montgomery et al. | 117/106 |
| 2,691,605 | 10/1954 | Hediger | 117/62 |
| 3,925,577 | 12/1975 | Fatzer et al. | 427/249 |
| 4,294,788 | 10/1981 | Laskow et al. | 264/101 |
| 4,564,496 | 1/1986 | Gupta et al. | 264/44 |
| 4,618,591 | 10/1986 | Okamura et al. | 501/90 |
| 4,626,516 | 12/1986 | Morelock | 501/92 |
| 4,871,587 | 10/1989 | Levin | 427/249 |
| 4,900,531 | 2/1990 | Levin | 423/345 |
| 5,250,324 | 10/1993 | Claar | 427/376.6 |
| 5,322,824 | 6/1994 | Chia | 501/89 |
| 5,338,576 | 8/1994 | Hanzawa et al. | 427/430.1 |

FOREIGN PATENT DOCUMENTS

| | | | |
|---|---|---|---|
| 1102185 | 6/1981 | Canada | F16C 33/16 |
| 2834315 | 8/1978 | Germany | C04B 41/24 |
| 1394106 | 5/1975 | United Kingdom | C01B 31/36 |

*Primary Examiner*—Benjamin Utech
*Attorney, Agent, or Firm*—Banner & Allegretti, Ltd.

[57] ABSTRACT

This invention relates to a composite of silicon carbide and carbon. This invention also relates to its manufacturing method. An obtained composite is used as heat resistant, wear resistant or chemical resistant materials. The object of this manufacturing method is to form a deep layer of silicon carbide and carbon in the surface of a carbon base by a simple process of causing a silicon containing material to penetrate into and react with the carbon block. Further object of this invention is to produce a compound in whole comprised of silicon carbide and carbon if the carbon block is 20 mm or below in thickness. To this end, according to this forming method a carbon block having a lattice constant c of 6.708 Å to 6.900 Å or below and a density of 1.3 g/cm$^3$ to 1.7 g/cm$^3$ or below is formed into a desired shape, and molten silicon containing material is caused to penetrate into and react with the carbon block thereby to obtain a surface layer composed to silicon carbide and carbon to a surface depth of 20 mm or below and having substantially the same shape as the carbon block.

7 Claims, No Drawings

COMPOSITE OF SILICON CARBIDE AND CARBON AND METHOD OF MAKING THE SAME

This application is a divisional of application Ser. No. 08/200,689, filed Feb. 23, 1994 (now abandoned) which is a continuation-in-part of Ser. No. 07/975,341, filed Nov. 16, 1992 (now abandoned) which is a continuation-in-part of Ser. No. 07/886,335, filed May 20, 1992 (now abandoned) which is a continuation of Ser. No. 07/427,093, filed Jun. 6, 1990 (now abandoned).

TECHNICAL FIELD

This invention relates to a composite of silicon carbide and carbon and a method of making the same which can be used as heat resistant, wear resistant, or chemical resistant materials in various fields of industry.

BACKGROUND ART

Various method of obtaining a composite composed of silicon carbide and carbon have been proposed. In order to improve the resistance to oxidation and wear, and other properties of carbon material, there have been proposed methods of forming a film of silicon carbide on the surface of a carbon substrate, such as the method of forming a silicon carbide layer on the surface of a substrate by decomposition and reaction of a gaseous silicon compound (e.g., SiO gas), and the method of forming a silicon carbide film on the surface of a substrate by reaction of a gaseous silicon compound (e.g., $SiCl_4$) and a gaseous carbon compound (e.g., $CCl_4$ gas). However, the maximum thickness of the silicon carbide layer or film formed by such methods is about 2 mm.

On the other hand, in order to form silicon carbide in a carbon block there have been proposed a method which uses the above-mentioned gas phase reaction, and a method which uses a penetration reaction of molten silicon into a blocked carbon solid. By these methods it is possible to form silicon carbide in the blocked carbon solid to the depth of only several millimeters.

The present inventors once developed a method by which, in order to form silicon carbide deep in a thick carbon block, the carbon block is first oxidized at 400° C.–600° C. to make it porous and light in weight, and then a silicon containing material such as molten metallic silicon is caused to penetrate into and react with the porous block. By this method it is possible to attain a high rate of conversion of carbon to silicon carbide and form a carbon block in which a layer composed of silicon carbide and carbon is formed to the depth of above 1 cm.

Further studies and experiments, however, have disclosed that there are carbon blocks in which the layer composed of silicon carbide and carbon is not formed, but the reaction is limited to the surface thereof.

This invention has been made in view of the above-mentioned problem, and its object is to provide a new composite composed of silicon carbide and carbon and a method of making the same, wherein by selecting the crystallinity and density of a carbon block and simply causing a silicon containing material to penetrate into and react with the carbon block, it is possible to form a thick layer composed of silicon carbide and carbon on the surface of the carbon block with ease and without fail.

DISCLOSURE OF THE INVENTION

In order to attain the object of the invention, the invention comprises a composite composed of silicon carbide and carbon comprising at least a surface layer composed of silicon carbide and carbon being formed to a surface depth of 20 mm or below. The invention also comprises a method for making a composite of silicon carbide and carbon comprising the steps of: processing a carbon block having a lattice constant c of 6.708 Å to 6.900 Å and a density of 1.3 $g/cm^3$ to 1.7 $g/cm^3$ without chemical reaction into a desired shape, and causing a silicon containing material to penetrate into and react with the carbon block processed thereby to form a surface layer comprised of silicon carbide and carbon to a surface depth of 20 mm or below while substantially maintaining the desired shape of the carbon block processed.

In this invention, the phrase "processing a carbon block without chemical reaction" means that the carbon block is processed mechanically or physically, for example, by using machine tools such as lathes or machining centres, thereby causing no change in the value of either lattice constant c or density after processing is provided.

The basic concept of the invention for solving the problem is that with due consideration given to the chemical reactivity and density of the carbon block, by selecting these factors it is possible to form a carbon block with thick layer composed of silicon carbide and carbon.

From the above technical point of view, the present inventors have conducted penetration reactions of a silicon containing material on the surfaces of carbon blocks having different lattice constants c (crystallinities) and densities, compared the results and confirmed that in the blocks having a lattice constant c of 6.708 Å to 6.900 Å, and a density of 1.3 $g/cm^3$ to 1.7 $g/cm^3$, a uniform formation of silicon carbide is effected.

Generally, there are various forms of carbon having different crystallinities from an almost amorphous form such as carbon black to an almost perfectly crystallized form such as natural graphite. Except the natural form, the crystallinity depends on the temperature at which carbon is treated for graphitization in manufacturing the carbon block. The higher the temperature of graphitization treatment is, the higher the degree of graphitization is. At the same time, the lattice constant c of the material decreases to 6.708 Å, the constant c of natural graphite, as shown in FIGURE obtained by the example to be described later. Therefore, the degree of crystallization (graphitization) can be estimated by measuring the lattice constant c of the carbon block. It is known that generally the same materials have a higher activity in their amorphous state than in their crystal state. From the above, it is believed that the reactivity of carbon block can be estimated by measuring its lattice constant c by X-ray diffractometry.

It is believed that the density of a carbon block has a great influence on the void rate, in particular, on the penetration reaction of molten silicon with carbon as in the present invention. In fact, as shown in the result of the examples to be described later, a sufficient penetration reaction does not occur on the carbon block having a lattice constant c of 6.9 Å or below if its density exceeds 1.7 $g/cm^3$.

On the basis of the above observation and consideration, this invention has been made to provide a carbon block with thick layer composed of silicon carbide and carbon on its surface and a method of making the same wherein a carbon block having a lattice constant c of 6.708 Å to 6.900 Å and a density of 1.3 $g/cm^3$ to 1.7 $g/cm^3$, into which a silicon containing material is caused to penetrate and react there-with thereby to form a layer composed of silicon carbide and carbon more deeply in the carbon block than with the prior art method, while substantially maintaining the original shape of the carbon block.

The reason why the carbon block having a lattice constant c of 6.708 Å to 6.900 Å and a density of 1.3 g/cm³ to 1.7 g/cm³ can be converted into silicon carbide uniformly and deeply in the carbon block from the surface thereof is believed to be due to the following mechanism.

First, the reaction of the invention for forming silicon carbide is a reaction in which molten silicon penetrates into voids in the carbon block while reacting with the carbon to form silicon carbide. Since the conversion of carbon to silicon carbide accompanies expansion of the volume by about 2.4 times, the voids are filled with silicon carbide. Therefore, it is necessary that the carbon block should have voids into which molten silicon, etc. can penetrate. On the other hand, if the carbon block has too many voids, a sufficient penetration reaction may take place, but a problem is posed that the mechanical strength of the layer composed of silicon carbide and carbon becomes weak. Thus, with the method of invention there is an optimum density range of the carbon block. This is the reason why the density of the carbon block is between 1.3 g/cm³ and 1.7 g/cm³. However, as shown in the Embodiment to be described later, even with a carbon block having a density of 1.5 g/cm³, if it has a low crystallinity caused by graphitization treatment at low temperature, the penetration reaction is restricted to a shallow depth in the surface of the carbon block. This is believed to be due to the speeds at which the following two phenomena constituting the reaction of conversion of carbon to silicon carbide proceed:

(I) the speed at which molten silicon, etc. penetrate into the voids of carbon block by capillary action; and (II) the speed at which molten silicon, etc. react with carbon block in the surface of the voids to form silicon carbide, which expands about 2.4 times in volume thereby to fill the voids in the carbon block.

As described above, the carbon block which is less crystallized is more active than the carbon block which is more crystallized, and rapidly reacts with molten silicon, etc. Therefore, the above-mentioned reaction (II) proceeds faster than the above-mentioned penetration (I), so that silicon carbide occupies the voids in the surface of the carbon block, thereby preventing silicon from penetrating into the inside of the carbon block. As a result, it is only adjacent the surface of the carbon block that carbon can be converted to silicon carbide.

On the contrary, in the carbon block crystallized to 6.9 Å or below in lattice constant c, the above-mentioned reaction (II) becomes moderate as shown in the Embodiment to be described later, so that the above-mentioned penetration (I) progresses into the inside of the carbon block, and then the above-mentioned reaction (II) progresses thereby to form silicon carbide deep in the carbon block. The reason why the range of the lattice constant c is determined to be 6.708 Å and above is that the value corresponds to the lattice constant c of natural graphite which is a carbon having the highest crystallinity, and that there is practically no carbon having a smaller lattice constant c than the above-mentioned value.

A carbon preform for obtaining a carbon block which has yet not been processed into a desired shape is made by mixing ground coke and pitch, applying a uniaxial pressure to the mixture, calcining the mixture below 1000° C., and then graphitizing the calcined mixture at 1000° C. to 3000° C. The parameter c which is characteristic of the invention is determined by the temperature of graphitization and not affected by the pressure at which is it formed.

In the carbon preform, the pitch serves as a binder. When the mixture is calcined, vaporable components in the pitch are dissipated to leave carbon. Open pores are formed in the carbon block by being evaporating the vaporable components from the carbon preform, and molten silicon penetrates into the pores so that a thick layer composed of silicon carbide and carbon is formed on the surface of the carbon block. The type of the binder used hardly affects either the graphitization or the parameter c.

The required degree of porosities can be changed by the amount of the binder used. The density of 1.5 g/cm³ shown in Table 2 results from blocks of the carbon preform containing the same amount of binder calcined at 400° to 600° C. to reduce their weight and make pores therein.

As described above, in accordance with the method of the invention, by causing a molten silicon containing material to penetrate into a carbon block having a lattice constant c of 6.708 Å to 6.900 Å, preferably 6.86 Å–6.90 Å and a density of 1.3 g/cm³ to 1.7 g/cm³, it is possible to obtain a thick layer composed of silicon carbide and carbon formed to the depth of about 20 mm from the surface of the carbon block, as was very difficult in the prior art, and to manufacture a thick layer composed of silicon carbide and carbon having a required high density and strength with ease and certainty.

Further, if the carbon block into which a molten silicon containing material penetrates is 20 mm or below in thickness, the penetration reaction is not limited to the surface layer thereof, thereby to form a composite in whole comprised of silicon carbide and carbon.

BEST MODE OF EMBODYING THE INVENTION

Some examples and an embodiment of the invention will be described below.

A relation between the temperature of graphitization and the lattice constant c has been revealed on the basis of the following examples for obtaining a carbon block having a desired lattice constant c and density. 17% by weight of silicon is added to and milled with each of the carbon blocks graphitized at known temperature of 880° C., 1000° C., 1550° C., 1800° C., 2000° C., 2300° C., 2600° C. and 2900° C., respectively, and the mixture are measured by X-ray diffractometry (with Cu, Kα, 35 kV-15 mA). The silicon is an internal standard for determining the lattice constant. The lattice constants c of the carbon blocks determined by the d value (plane distance) of 002 diffraction line are plotted against the temperature of graphitization. The carbon blocks treated at 880° C. and 1000° C., respectively, have very broad 002 diffraction lines, which shows that they have been scarcely crystallized. The lattice constant c determined by d002 is about 7.0 Å. On the other hand, the carbon blocks treated at 1500° C.–2000° C. produce sharper diffraction lines as the temperature rises, which shows higher degrees of crystallization. At the same time, as shown in the drawing, the lattice constant c decreases approaching to 6.708 Å of natural graphite. Thus, it has been found out that the degrees of crystallization (graphitization) of carbon block is mostly determined by the temperature of treatment for graphitization.

The reason why the best temperature for the graphitization is 1550° C.–2000° C. is as follows:

If carbon block is treated below 1550° C., it is not much graphitized so that reaction between carbon and molten silicon takes place easily and quickly, producing SiC adjacent the inlets of the open pores before the molten silicon penetrates deep into the open pores. The SiC produced has a volume 2.4 times as large as that of carbon so that the SiC closes the open pores, preventing the molten silicon from entering deeper into the pores to form a thick layer of SiC-C.

If carbon block is treated above 1550° C., it is significantly graphitized, so that reaction between carbon and molten silicon occurs slowly. This allows the molten silicon to enter deeply into the carbon block, where it reacts with the carbon to form SiC. The size of the SiC crystals formed depends upon the degree of graphitization of the carbon block that reacts with the molten silicon. Carbon block that has been much graphitized reacts slowly with molten silicon and forms larger SiC crystals.

If carbon block is treated above 2000° C., the SiC crystals formed may have a diameter larger than 10 μm. This is too large a size, which reduces the strength of the composite layer produced. It may happen that the composite layer is deformed due to the force with which the crystals push each other.

In the carbon block graphitized at 1550° C. to 2000° C., the molten silicon has penetrated sufficiently deep into the carbon block, with SiC crystals formed having a size less than 10 μm. As a result, the composite layer formed is not deformed but composed of thick layer of SiC-C.

On the basis of the above-mentioned results, 0.05 parts by weight of molten silicon is caused to penetrate into and react with carbon blocks treated for graphitization at different temperatures, and the depth of penetration is measured as shown in Table 1. The reaction is conducted in the atmosphere of argon gas at 1800° C. in a high temperature furnace for one hour.

The reaction products obtained are observed with the naked eye. No residue of silicon is observed in the carbon blocks having a lattice constant c of 6.9 Å or below (treated for graphitization at temperatures above 1550° C.). On the other hand, some residue of solidified molten silicon is observed on the surface of the carbon blocks having lattice constants c above 6.9 Å (treated for graphitization at temperatures of 880° C. and 1000° C.). The reaction products are then ground for measurement by X-ray diffractometry. The products obtained from the carbons having a lattice constant c of 6.9 Å or below are composed of—silicon carbide, carbon and a minute amount of silicon, with the reaction ratios calculated from the weights before and after the reaction being 88%–100%. The sectioned surfaces of the reaction products are observed with an X-ray microanalyzer to investigate how deep from the surface of each block silicon has penetrated into the block and has been converted to silicon carbide. The results of the observations are given in Table 1.

TABLE 1

| CARBON BLOCK | | | Depth |
|---|---|---|---|
| Temperature of treatment | Density ρ | c/Å | of penetration (mm) |
| 880° C. | 1.66 g/cm³ | 7.00 | Nearly zero |
| 1000° C. | 1.69 g/cm³ | 7.00 | Nearly zero |
| 1550° C. | 1.78 g/cm³ | 6.88 | 1.0 |
| 1800° C. | 1.76 g/cm³ | 6.86 | 1.5 |
| 2000° C. | 1.79 g/cm³ | 6.86 | 1.0 |

As shown in the above Table, in the blocks of those carbons which have lattice constants c above 6.9 Å, the reaction of forming silicon carbide does not sufficiently progress, and the penetration depth of silicon is nearly zero. On the other hand, in the blocks of those carbons which have a lattice constant c of 6.9 Å or below, the reaction is active, and silicon carbide is formed to the depth of 0.5 mm–1.5 mm from the surface.

In the example from which the results of Table 1 is obtained, the depth of penetration of silicon fluctuates even in those blocks which have a lattice constant c of 6.9 Å or below and in which the reaction is good. The fluctuation is believed to have been caused by the use of carbon blocks having different densities above 1.7 g/cm³. Therefore, by using carbon blocks having the same density of 1.5 g/cm³ and treated at different temperatures, silicon is caused to penetrate into and react with the carbon blocks. The results are shown in Table 2. The penetration reaction is conducted in a heating device by heating the carbon blocks with metal silicon on the surface thereof in an atmosphere of argon gas at 1800° C. The amount of silicon which is reacted with each of the carbon blocks is between 0.4 and 0.7 in weight ratio to carbon.

As shown in the Table 2, if the penetration reaction is conducted by using carbon blocks having the same density, it is possible to increase the Si/C ratio from 0.05 to 0.4–0.7. A good reaction is observed in all of the carbon blocks having a lattice constant c of 6.9 Å or below, with silicon having reacted with carbon uniformly to a depth of 1.4 mm or above from the surface. In particular, in the carbon blocks which have been treated for graphitization at a temperature above 1800° C. and have a lattice constant c of 6.86 Å or below, the reaction is good, and observation of the reaction products with the naked eye and identification thereof by X-ray diffractometry reveal that silicon carbide is formed to a depth of about 20 mm from the surface. In this embodiment, as the carbon block is more than 20 mm in thickness, the composite produced has a surface layer comprised of silicon carbide and carbon formed to a depth of about 20 mm from the surface of the carbon block and the deeper part than 20 mm from the surface comprised of carbon only which constitutes the carbon block. If the carbon block into which a molten silicon containing material penetrates is 20 mm or below in thickness, the penetration reaction is not limited to the surface layer thereof, thereby to form a composite in whole comprised of silicon carbide and carbon. In short, regardless of the thickness of the carbon block, the surface layer is formed to the depth of about 20 mm from the surface of the carbon block. In the carbon blocks which have lattice constants c exceeding 6.9 Å, the depth of penetration of silicon is increased by making their density 1.5 g/cm³. However, the value is 1.2 mm or below, and a residue of silicon that has not reacted with carbon remains on the surface of the products. From the above it has been concluded that lowering of the density of carbon is not sufficient for uniform conversion of carbon to silicon carbide, and that the conversion is closely related to the crystallinity and density of carbon blocks. The reason therefore is the difference in the reaction process caused by the crystallinity of the carbon as previously mentioned.

TABLE 2

| CARBON BLOCK | | | Depth of |
|---|---|---|---|
| Temperature of treatment | Density ρ | Degree of reaction | penetration (mm) |
| 880 C. | 1.5 g/cm³ | Bad | 0.8 |
| 1000° C. | 1.5 g/cm³ | Bad | 1.2 |
| 1550° C. | 1.5 g/cm³ | Good | 1.4 |
| 1800° C. | 1.5 g/cm³ | Good | 2.4 or above |
| 2000° C. | 1.5 g/cm³ | Good | 2.4 or above |

POSSIBLE INDUSTRIAL APPLICATIONS

As described above, the composite of silicon carbide and carbon in accordance with the invention is applicable to use as heat resistant, wear resistant and chemical resistant materials. Such heat resistant and wear resistant materials are materials used in the manufacturing process of glass bottles such as a material for a pair of tongs for picking glass bottles such as a material for a pair of tongs for picking glass bottles from a finishing die, a plate for supporting glass bottles, or a material for forming a sliding guide surface. The chemical resistant materials can be used as a material for a die which contacts molten metal, a material for forming a trough for guiding molten metal into the die, etc.

This invention also relates to the method of making the above mentioned composite.

What is claimed is:

1. A method for making a composite having a surface layer composed of silicon carbide and carbon comprising the steps of shaping a carbon block having a lattice constant c of 6.708 Å to 6.900 Å and a density of 1.3 g/cm$^3$ to 1.7 g/cm$^3$ without chemical reaction and causing a silicon-containing material to penetrate the surface of the carbon block and react with the carbon block to form the surface layer composed of silicon carbide and carbon; wherein the depth of the silicon carbide and carbon surface layer is 2.4 mm to 20 mm; and the shape of the carbon block is substantially maintained.

2. The method of claim 1 wherein the carbon block has a lattice constant c of 6.800 Å to 6.900 Å.

3. The method of claim 1 wherein the carbon block is greater than 20 mm in thickness.

4. The method of claim 3 wherein the carbon block has a lattice constant c of 6.800 Å to 6.900 Å.

5. The method of claim 4 wherein the silicon-containing material penetrates the entire carbon block.

6. The method of claim 1 wherein the carbon block is 20 mm or less in thickness.

7. The method of claim 6 wherein the carbon block has a lattice constant c of 6.800 Å to 6.900 Å.

* * * * *